United States Patent [19]

Hudacsek et al.

[11] Patent Number: 4,703,645
[45] Date of Patent: Nov. 3, 1987

[54] METHOD OF AND EQUIPMENT FOR QUALIFYING SHOCK ABSORBERS OF A MOTOR VEHICLE

[75] Inventors: István Hudacsek; Géza Orcsik, both of Budapest; Zoltán Házfalvy, Lengyeltóti; László Kotsis, Budapest; Endre Németh, Budapest; László Noé, Budapest; Ferenc Ovári, Budapest, all of Hungary

[73] Assignee: Hiradastechnikai Gepgyar, Budapest, Hungary

[21] Appl. No.: 837,586

[22] Filed: Mar. 7, 1986

[30] Foreign Application Priority Data

Apr. 18, 1985 [HU] Hungary .............................. 1500/85

[51] Int. Cl.$^4$ .......................................... G01M 17/04
[52] U.S. Cl. ...................................................... 73/11
[58] Field of Search ................................... 73/11, 669

[56] References Cited

U.S. PATENT DOCUMENTS

| | | | |
|---|---|---|---|
| 3,855,841 | 12/1974 | Hunter | 73/11 |
| 3,937,058 | 2/1976 | Hillbrands | 73/11 |
| 4,002,051 | 1/1977 | Hillbrands | 73/11 |
| 4,589,273 | 5/1986 | Tamasi et al. | 73/11 |

OTHER PUBLICATIONS

Recommendation for a Performance Test Specification of an "On Car" Vehicle Suspension Testing System Publication TS 02 76.

*Primary Examiner*—Charles A. Ruehl
*Attorney, Agent, or Firm*—Handal & Morofsky

[57] ABSTRACT

A method and equipment for qualifying shock absorbers of motor vehicles including the placing of the wheels of the vehicle on suitable supports, measuring the static contact force acting standstill, imposing a forced constant amplitude sinusoidal vibration to, and exceeding the natural resonance frequency of the chassis, then removing this excitation and measuring the contact force as a function of the changing frequency. The positioning of the wheels are checked before the forced vibration, then when the frequency drops below natural frequency, one wheel is vibrated at natural frequency of the chassis by holding the frequency of forced vibration to that value, and at that frequency the minimum contact force is measured, then the value characteristic of the applied shock absorber is determined from the static contact force and minimum contact force. The apparatus has a supporting member to transfer the swinging motion to the wheel of the vehicle chassis, a force-sensing unit coupled to the supporting member, an electronic measuring unit to receive the signals of the force-sensing unit and a unit to check proper adjustment of the pair of wheels, wherein the electronic measuring unit includes dynamometers indicating the forces arising in the supporting member coupled to each unit of the pair of wheels, and a control processor unit to process the output signals of the dynamometers.

11 Claims, 2 Drawing Figures

METHOD OF AND EQUIPMENT FOR QUALIFYING SHOCK ABSORBERS OF A MOTOR VEHICLE

BACKGROUND OF THE INVENTION

The invention relates to a method of and equipment for qualifying shock absorbers of a motor vehicle. In the course of realizing the proposed method a pair of wheels from the chassis of a vehicle are placed on a support in a known manner, and the static contact force acting in standstill is measured. The wheels are then given a constant-amplitude sinusoidal or approximately sinusoidal excitation to bring them into a vibration (swinging movement) above the natural resonance frequency of the vehicle suspension. Then, after removing the excitation, the contact force is measured as a function of the changing frequency. The equipment comprises a supporting member to transfer the vibration to at least one of the wheels, a dynamometer unit is coupled to the supporting member and an electronic measuring unit is connected to receive the signals from the dynamometer. The method and equipment complying with the invention are intended for use in qualifying the suspension system of motor vehicles, especially in the course of their official testing, thereby ensuring a substantial reduction in the time required for obtaining highly reliable accurate measuring results on which acceptable qualification can be based also for official use.

The shock absorbers mounted into motor vehicles serve, on the one hand, for damping vibrations of the vehicle chassis resulting from the unevenness of roads, and for eliminating the occurrence of spring deflections to a full bump by transforming them into slow lower-amplitude spring vibrations. On the other hand, it is also the task of shock absorbers to ensure optimum road-holding properties to satisfy road safety considerations. Roadholding properties obviously depend on the prevailing load acting on the wheels and on the friction coefficient which is a characteristic of the material of the road surface and the tires. The forces acting on the vehicle wheels are subject to constant changes depending on the unevenness of the roadway and other excitation effects. This load variation of the vehicle wheels is decisively influenced by the quality of the shock absorber. Because of the damping of the wheel swings through the dynamic load fluctuations on the wheels, and consequently, it will through the varying magnitude of the friction force of the tires, considerably affect the braking and accelerating conditions of the vehicle and its behaviour under the action of side forces.

Thus, the qualification of shock absorbers assembled into vehicles is a task of utmost importance from the point of view of road safety, and several different methods of qualification are known. A common feature of these methods, is based on the measurement of chassis swings or of the damping of wheel swings, correspondingly, the chassis or wheel is brought into vibration, and the displacements are recorded. However, in regards to road safety considerations, no satisfactory results have been obtained by the method of swinging the chassis.

In qualifying shock absorbers, according to the Recommendation TS-02-76 issued by EUSAMA (European Shock Absorber Manufacturers Association) the following main requirements have to be satisfied:

the vertical static contact force between tire and support member should be measured, the supporting member should be given a sinusoidal excitation to bring the vehicle into vibration, the ratio of the minimum dynamic contact force $F_{min}$ measured on the supporing member at the wheel resonance frequency to the static contact force $F_{stat}$ should be expressed as a percentage, this being the test result according to the formula $$F_\% = 100 \frac{F_{min}}{F_{stat}}.$$

the proposed minimum frequency of exciting the supporting member is 24 Hz, one operator (driver) sitting in the driver's seat should be able to perform the measurement, including the putting of the vehicle into desired position, when a test result of up to 20% is obtained, the shock absorption is unsatisfactory, in the range of 20 to 40% the shock absorption is considered as fair, above 40% it is good, and it is excellent in the range over 60%.

For performing said qualification proceeding an arrangement is known from technical literature as a "Bogeian shock absorber tester" where a supporting member, a wheel fitted out with a tire placed on it and the chassis are brought into vibration by the driving motor through an eccentric and a spring. First, the frequency of excitation is increased into the range beyond the resonance frequency of the chassis (vehicle suspension), then, after disconnecting the driving motor, the excitation frequency is gradually reduced. In the course of this reduction of frequency, the frequency of excitation passes through the natural resonance frequency of the chassis. During runout, the displacements of the tire support is recorded on a time-scale chart.

In this case, however, the state of the vibrating system fails to correspond to the realistic road conditions, considering the dependence of the resultant resonance frequency of the rigidity of the spring of the test bench, on the mass of the supporting member, on the unsprung mass of the chassis and on the spring of the vehicle body. Consequently, the vibrating system gets detuned, so the magnitude of the measured resonance amplitude and the qualification of the shock absorber from the point of view of road safety is only possible in a circumstantial way, through correlation. A further deficiency of this approach is the necessity of knowing certain limiting values depending on the construction of the vehicles and the shock absorbers. This renders the handling of the equipment extremely cumbersome, imposing a difficult task on the operating personnel.

A test method and equipment approximately complying with the EUSAMA recommendations are described in the specification of the Hungarian Pat. No. 176 823 and in the corresponding European patent application open-laid under No. 0 049 303 /the Applicant is the Közlekedéstudományi Intézet—Institute for Communication Sciences—Budapest/. The method as disclosed essentially consists of establishing the mean values and the minimum tire-force pertaining to the passage through the natural frequency of the chassis, which are then used as a basis for qualifying shock absorbers. As a main feature of the equipment, the exciting unit and the supporting member are coupled together through a double-arm lever and a pre-sensing unit is linked up with the fulcrum of said lever, the unit being connected to an electronic dynamometer unit.

The main disadvantages of this arrangement and of an Italian equipment CEMB Diam 183 operating on a similar principle are as follows:

With both arrangements the first result is of higher numerical value than those obtained with the second and third readings. After the third reading the test results become stable. The reason of these deviations between successive readings lies in the increasing temperature of the oil filling in the shock absorber, that stabilizes only after the third reading. Therefore an accurate and reproducible measurement is rather time consuming.

Any change in the static wheel-load directly influences the test result. Therefore, the lower the dead weight of the vehicle the impending result will be more dependent on the vehicle load.

The vehicle must stand on a defined part of the measuring device. The required position of the vehicle on said surface can be checked by the driver either with the use of some outside assistance, or he has to get out of the driver's seat and climb into it again.

The test results depend on the tire pressure, so the air pressure in the tire has to be kept within specified limits during the testing of a shock absorber. When a row of vehicles is queing up for road safety testing, any deviation is objectionable, because—for quick passing through—each single test must be completed within a given duration of time. Should an adjustment of tire pressure be required on a vehicle before the test, this would mean taking essentially longer time than any other test, such as a brake test, headlamp setting, gas analysis, etc.

SUMMARY OF THE INVENTION

The invention is intended to eliminate the disadvantages outlined above. It is based on the recognition that by means of vibrating the vehicle at resonance frequency of its suspension, the oil in the shock absorber and the tire can quickly be brought to the required temperature, so the time needed for obtaining reproducible test results can be reduced.

Correspondingly, the invention is aimed at elaborating a method and equipment, whereby the qualification of shock absorbers built into the chassis of vehicles can be performed with a high degree of reliability and within a shorter time than before, and the test can be easily fitted into the system of an official qualification proceeding.

For attaining the above object, an improved method and equipment have been developed.

In the course of performing the proposed method of qualifying the shock absorption of a vehicle, the wheels of the chassis should be placed on a supporting member, and the static contact-force characteristic of standstill is measured. The wheels of the chassis are given a sinusoidal excitation of constant amplitude above the natural resonance frequency of the vehicle suspension. Then the excitation is disconnected and the contact force is measured, wherein, according to the invention, the positioning of tires checked, before the qualification mesurements, the excitation is ensured to bring the wheels into movement for a short time, say through a period of 10 seconds at natural resonance frequency of the chassis the minimum contact force is measured. Finally, the value characteristic of the shock absorption of the suspension is determined from the static contact force and minimum force readings.

According to an especially favourable way of carrying out the proposed method, static contact force $F_{stat}$ and minimum contact force $F_{min}$ are measured in an unloaded condition of the vehicle, and the value of the $F_\%$ characteristic of shock absorption is determined from the formula $$F_\% = 100 \frac{F_{min} + F_t}{F_{stat} + F_t} = F_{0\%} \qquad (1)$$

where $F_t$ is a constant characterizing the vehicle in its loaded condition.

If the tire pressure is also to be considered, this is preferably done in the course of the test by measuring at maximum frequency of excitation the dynamic contact force $F_{dyn}$ characteristic of the chassis, and determining the value characterizing shock absorption from the formula $$F_\% = F_{0\%} + C_1 F_{dyn} - C_2, \qquad (2)$$

where $C_1$ and $C_2$ are constants characteristic of the tires mounted on the wheels, the relation between said constants being $C_1 F_{dyn} - C_2 = 0$ at nominal pressure of the tires and $F_{0\%}$ has a value determined according to the formula (1). The vehicle may be excluded from the test, if the value of $C_1 F_{dyn} - C_2$ exceeds a given limit.

The proposed equipment comprises a supporting member exciting the wheel of the vehicle's chassis, a force-sensing unit coupled with the supporting member, and an electronic measuring unit receiving the signals generated by the force-sensing unit, wherein—according to the invention—the equipment is provided with a unit for checking the position of the pair of wheels of the chassis on the supporting member, and the electronic measuring unit contains dynamometers indicating the forces acting on the supporting members coupled to the members of the pair of wheels and, further, the electronic measuring unit incorporates a control unit for processing the output signals of the dynamometers, where the control unit, preferably of the microprocessor type, is connected through a motor controller coupled with the motor serving for exciting the supporting member to vibrate (swing) and is linked up with a display unit.

Proper positioning of the chassis wheels can easily be checked from the inside of the vehicle from the driver's seat, if the unit serving for checking proper positioning of the pair of wheels of the chassis is provided with comparator means coupled to the dynamometers, the means comparator forming a part of the control processing unit.

The usefulness of the proposed equipment is enhanced, if it is completed with a printer controlled from the central processing unit and contains a display.

With the help of the method and equipment complying with the invention reliable qualification of shock absorbers built into vehicles can be performed with a considerable saving of time.

BRIEF DESCRIPTION OF THE DRAWINGS

In the following description the subject of the invention is detailed in connection with a method and preferred embodiments of the equipment shown by way of as examples, with reference to the attached drawings, where.

DESCRIPTION OF A PREFERRED METHOD AND EQUIPMENT

Figure 1:
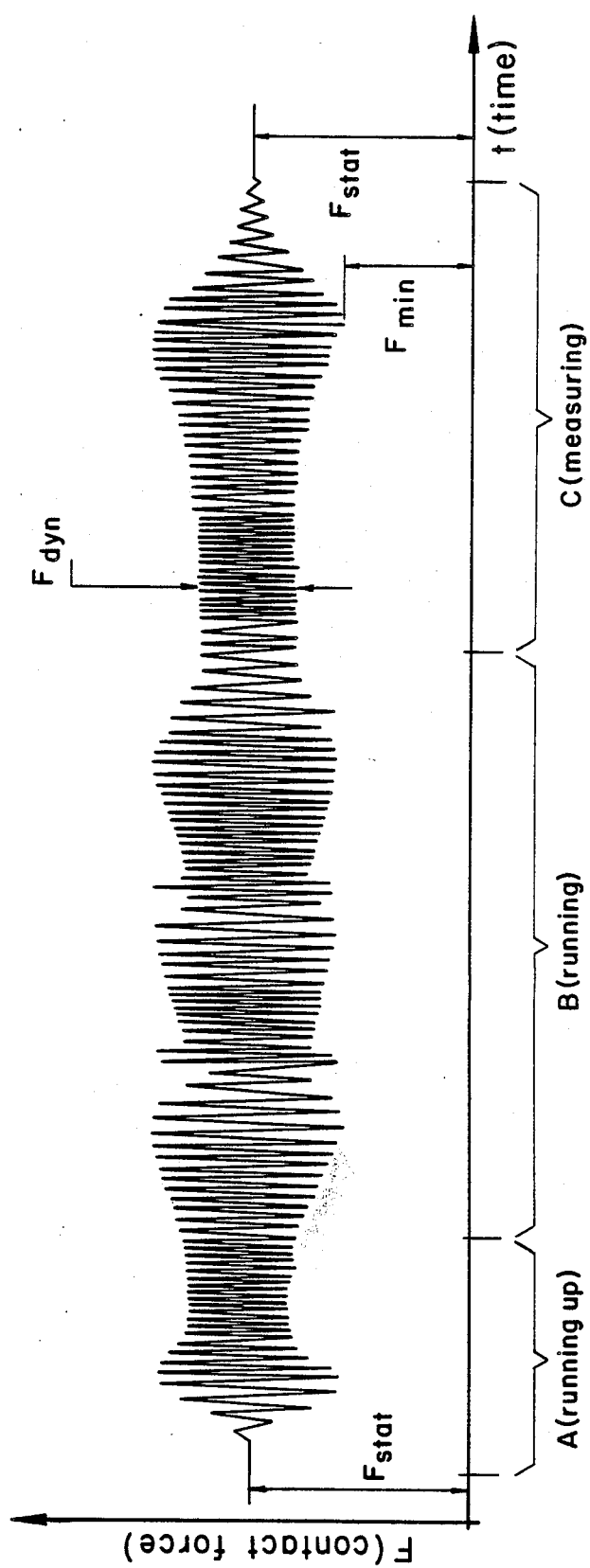
FIG. 1 shows, as an example, a curve of measuring results constituting the basis of carrying out the method of the invention.

In the course of carrying out the method detailed in the description of the invention, the wheels of the front and/or rear axles of the vehicle have to be brought over supporting members provided with dynamometer units. The wheels have to be within a given surface area with respect to the dynamometers because incorrect positioning should falsify the result. After checking proper alignment, one wheel of the vehicle is brought into contact with an exciting unit and, as specified by the mentioned EUSAMA Recommendations, excitation of the supporting member is started producing a sinusoidal vibration (swinging movement) with a minimum frequency of 24 Hz. Meanwhile, the variations of the contact force F acting between the supporting member and the wheel placed thereon are plotted as a function of time t, obtaining a curve similar to that shown in FIG. 1. From this curve, within a run-up period A, following the measurement of the static contact force $F_{stat}$, the natural frequency is determined, then, within a running period B, a wheel is vibrated at natural frequency and within a measuring period C, the readings are taken. During the latter period, dynamic contact force $F_{dyn}$ and minimum contact force $F_{min}$ can be determined.

During the run-up period A, the characteristic change taking place in the connection between the wheel and the supporting member at the natural frequency of the chassis is utilized. This change can be observed, e.g., by measuring the amplitudes, and after having passed beyond natural frequency, the excitation is disconnected. By said amplitude measurement or by some other way, it is found at what instant the frequency has dropped below natural frequency. Now, excitation is reconnected, and by continuous or intermittent operation of the vibrating machine it is ensured that through a required period of time—e.g. through 10 seconds in the case of passenger cars—the shock absorber will be exposed to the effect of impulses of force with the natural frequency of the chassis. According to the basic recognition of the invention, with this method the rapid heating of the tire and that of the oil filling in the shock absorber can be achieved, i.e. the shock absorber will get into the state corresponding to, or approximating to the desired extent, the operating condition of the motor vehicle. The duration of the measurements generally depends on the type of the vehicle to be checked. With the wheel vibrated at natural resonance frequency, the contact force is measured. This can be done, e.g. by applying the well-known method of sampling, i.e. by taking samples from the measuring signals at definite intervals. The lowest value of the contact force is determined, this will be the minimum contact force $F_{min}$. Then, excitation is disconnected and the measurement is carried on by applying the excitation to the other wheel. To save time, the change-over to the next wheel is done by starting the excitation of the next wheel when the vibration frequency of the previous one drops below a given limit, say 1 Hz.

Before starting with the measurements, after having checked proper positioning of the pair of the wheels of a chassis, or on completion of measurements, the static contact force $F_{stat}$ is determined, that should reflect the contact force acting between the wheel and the supporting member at standstill. In the case of heavy vehicles, the two data, $F_{min}$ and $F_{stat}$, are sufficient for qualifying shock absorbers, i.e. the ratio $F\% = 100\ F_{min}/F_{stat}$ is taken as being characteristic of a shock absorber, and suitable also for official checking purposes. In the case of passenger cars, due to their lower mass, qualification of shock absorbers strongly depends on the load. Therefore, it is preferred to use the formula $$F_\% = 100\ \frac{F_{min} + F_t}{F_{stat} + F_t} = F_{0\%}, \quad (3)$$

where $F_t$ is an empirically determined constant characteristic of the load. E.g., for smaller passenger cars, the value $F_t = 20$ may be accepted, since this represents an excess mass of 80 kg, taking into account the four wheels of a passenger car. Obviously, depending on the given conditions, $F_t$ may have some other value as well.

The forces acting between the supporting member and the wheel can be measured practically only when the wheel has a tire. According to the basic recognition of the invention the tire-pressure of a wheel affects the measured result only slightly. If, however, the tire pressure is too high or too low, its value may falsify the test result. This effect is taken into account, if needed—and for doing so it is not necessary to plot a separate curve—by measuring the dynamic contact force $F_{dyn}$ characteristic of the chassis, whereas the tire pressure is taken into consideration on the basis of the formula $$F_\% = F_{0\%} + C_1 F_{dyn} - C_2, \quad (4)$$

where $C_1$ and $C_2$ are empirically determined constants characteristic of the tire, and at nominal tire pressure $C_1 F_{dyn} - C_2 = 0$. Measurement of the value of $C_1 F_{dyn} - C_2$ can also be accomplished and, when necessary, on exceeding a given limit, an alarm signal can be generated for the operator performing the qualification. The value of $F_{0\%}$ follows from the formula (3).

Figure 2:
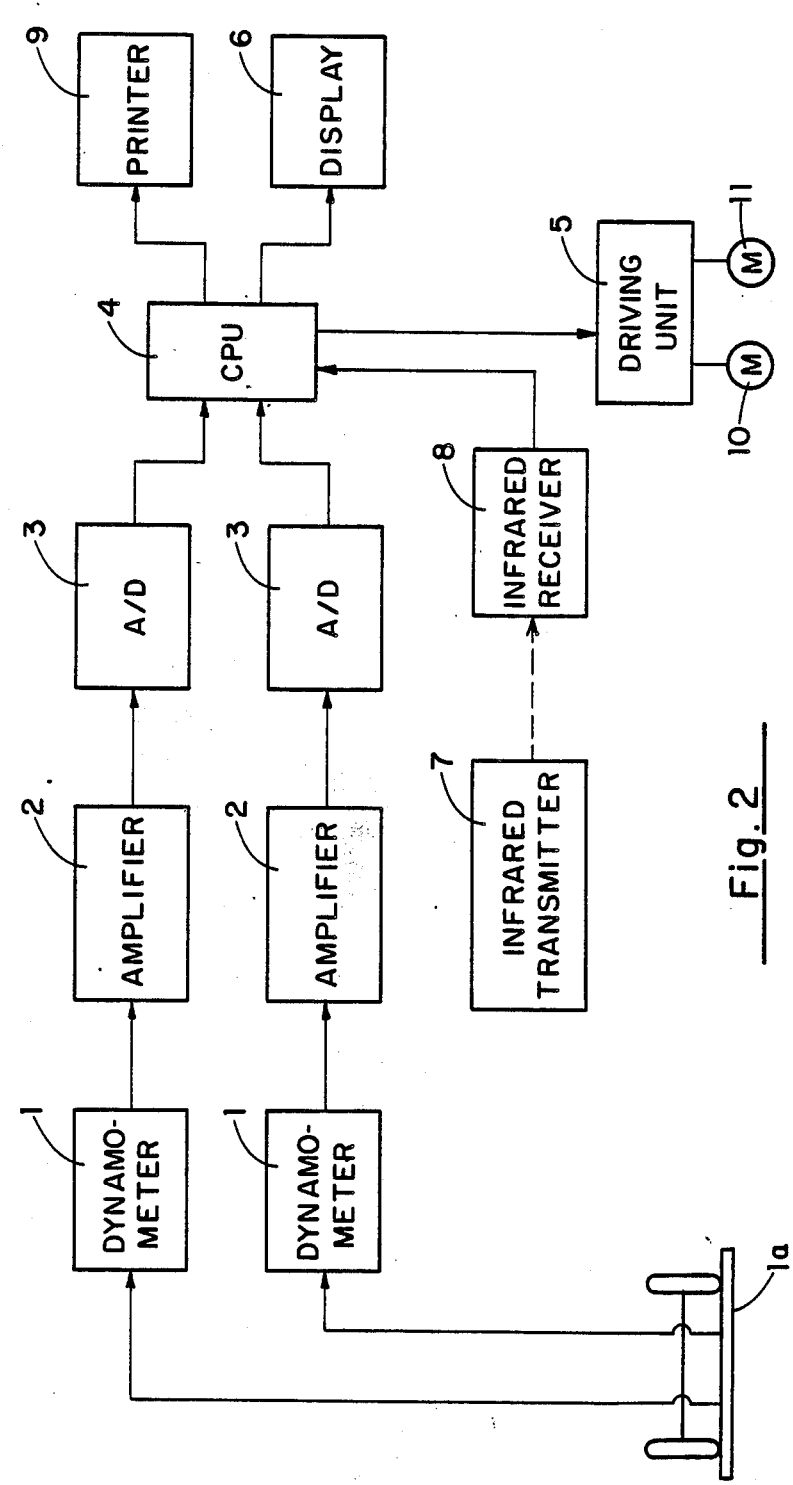
FIG. 2 is the block diagram of the equipment proposed by the invention.

The equipment (FIG. 2) also suitable for accomplishing the method proposed by the invention is connected through a dynamometer cell 1 to each of the wheels resting on a supporting member 1a. Said equipment being suitable to follow the variations of contact force F arising between the wheel and the supporting member when the latter is excited by vibration, thus generating signals required for determining the magnitudes of the static contact force $F_{stat}$ and the dynamic contact force $F_{dyn}$. Outputs of the dynamometers 1 are connected to amplifiers 2, which are coupled through A/D converters 3 with a control processor unit 4. The control processor unit 4 is purposefully a microprocessor and comprises an equipment-oriented integrated circuitry. To its outputs are connected, on the one hand, a display 6 and, on the other hand, a printer 9, and it is led through a control output to a motor driver 5. This latter provides for a driving motor 10 of the left-hand-side wheel and a motor 11 of the right-hand-side wheel, or for driving some other unit exciting the supporting members at frequencies as required, i.e. performing excitation of the chassis as required. The control processor unit 4 checks proper support and positioning of the wheels of the chassis on the basis of signals generated by the dynamometers 1, issuing information through the display unit 6, and disables the measurement when necessary. The equipment can be controlled from the inside of the vehicle through infrared remote control by means of an infrared receiver 8 obtaining signals from an infrared transmitter 7.

Operation of the equipment according to the invention is as follows:

Proper positioning of the wheels should be ensured in correspondance with the information appearing on the display 6. This can be also accomplished by the driver sitting in the vehicle. Next, with the help of the infrared transmitter 7, a command for starting the measurement can be issued. This command is accepted and executed by the control processor unit 4, if the vehicle is in proper position. As one possibility of checking fulfilment of the latter condition, the control processor unit 4 establishes from the signals of dynamometers 1 the weight difference upon standing-up, and makes this value, together with other information, appear on the display 6. Utilizing this information, the driver is capable of performing the required maneuver with the vehicle to minimize this difference. After attaining the required position, the motor 10 or the motor 11 is set into operation through the motor driving unit 5, ensuring the plotting of the measured curve shown in FIG. 1, analysis of the measured curve during operation, establishment of the resonance frequency (natural frequency) and control of excitation in such a way as to make the wheels of the chassis vibrate at natural resonance frequency through the required period of time, say 10 seconds. The required duration of time depends on the size of the vehicle, this duration being generally 10 seconds for passenger cars. It is also ensured by the central processing unit 4 to make the value $F\%$ qualifying the shock absorber appear on the printer 9 and on the display 6, on the basis of the readings obtained.

The control processor unit 4 can be fitted, in the known way, also with memory units, the contents of which can be recorded by the printer 9, together with the result of measurement.

Another means of the control processor unit 4 can serve for following the diminishing frequency of excitation of the wheel and on entering a predetermined frequency range below say 1 Hz for generating an order of initiating the excitation process of the other non-qualified wheel of the same axle.

By means of the method and equipment proposed by the invention the official testing proceeding of a motor vehicle provides an accurate, reproducible and highly reliable result for official qualification purposes in approximately 3 minutes.

What we claim is:

1. In a method of qualifying shock absorbers of a motor vehicle, comprising the steps of placing wheels of a vehicle chassis on suitable supporting members, measuring the static contact force being characteristic of standstill, checking the positioning of said wheels before applying an excitation thereto, exciting the wheels beyond the natural frequency of the chassis by inducing them to assume sinusoidal vibration having a constant amplitude, removing said excitation, measuring the contact force as a function of the changing frequency, after removing said excitation and when the frequency drops below natural frequency, making one of said wheels vibrate at natural resonance frequency of said chassis by controlling the frequency of excitation and measuring the minimum contact force at said natural resonance frequency, determining, on the basis of said static contact force and said minimum contact force, the value characteristic of shock-absorption.

2. The method as set forth in claim 1, further comprising the step of measuring said static contact force $F_{stat}$ and said minimum contact force $F_{min}$ in unloaded condition of the vehicle, and determining the value of $F\%$ characteristic of shock-absorption from the formula $$F\% = 100 \frac{F_{min} + F_t}{F_{stat} + F_t} = F_0\%$$

where $F_t$ is a constant characterizing the vehicle loading.

3. The method as set forth in claim 2, comprising the further step of measuring at maximum frequency of excitation the dynamic contact force $F_{dyn}$ characteristic of the chassis, and determining the value of $F\%$ characteristic of shock-absorption from the formula $$F\% = F_0\% + C_1 F_{dyn} - C_2,$$

wherein $F_0\%$ means the value determined on the basis of said forces $F_{min}$, $F_{stat}$, $F_t$, and $C_1$ and $C_2$ are constants characteristic of the tire on the wheel, and the relation between said constants $C_1$ and $C_2$ being $C_1 F_{dyn} - C_2 = 0$ at nominal tire pressure.

4. The method as set forth in claim 3, comprising the step of generating a warning signal if the determined valve exceeds a given limit.

5. The method as set forth in claim 1, wherein said one wheel is vibrated at natural resonance frequency of the chassis for a period of about 10 seconds.

6. The method as set forth in claim 1, including the step of starting said excitation of another of said wheels after dropping the excitation frequency of said one wheel below 1 Hz.

7. Apparatus for qualifying shock absorbers of a motor vehicle, comprising a supporting member for bringing one of the wheels of the vehicle chassis into vibration, a force-sensing unit coupled with said supporting member and producing output signals as a result of said sensing, an electronic measuring unit receiving said signals outputted by said force-sensing unit and, means for checking the proper positioning of a pair of wheels of the chassis, wherein the force-sensing unit comprises dynamometer means for indicating the forces arising in said supporting member coupled to said one wheel and said electronic measuring unit includes a control processor unit for processing the output signals of said dynamometer means, said control processor unit being connected through a motor controller coupled to a motor vibrating said supporting member and provided with a display unit.

8. The apparatus as set forth in claim 7, wherein said means for checking proper positioning of the pair of wheels of the chassis include comparator means coupled with the dynamometer means, said comparator means being included in the control processor unit.

9. The apparatus as set forth in claim 7, wherein said control processor unit includes storage means for storing data and texts to be printed out.

10. The apparatus as set forth in claim 7, further comprising a printer controlled by the control processor unit.

11. The apparatus as set forth in claim 7, wherein said control processor unit comprises microprocessor means.

* * * * *